(12) United States Patent
Polk

(10) Patent No.: US 7,669,592 B2
(45) Date of Patent: Mar. 2, 2010

(54) SOLAR POWER PLANT

(76) Inventor: Steven Polk, 5231 Cold Spring La., West Bloomfield, MI (US) 48332

( * ) Notice: Subject to any disclaimer, the term of this patent is extended or adjusted under 35 U.S.C. 154(b) by 0 days.

(21) Appl. No.: 11/725,366

(22) Filed: Mar. 19, 2007

(65) Prior Publication Data
US 2007/0221210 A1 Sep. 27, 2007

Related U.S. Application Data

(60) Provisional application No. 60/783,956, filed on Mar. 20, 2006.

(51) Int. Cl.
*F24J 3/02* (2006.01)
(52) U.S. Cl. ............ 126/643; 126/440; 126/425; 126/634; 60/669; 60/670
(58) Field of Classification Search .......... 126/643, 126/440, 425, 438; 248/125, 176, 214; 202/234, 202/185.5, 185.6
See application file for complete search history.

(56) References Cited

U.S. PATENT DOCUMENTS

| | | | | |
|---|---|---|---|---|
| 1,676,806 | A * | 7/1928 | Smalley | .......... 415/92 |
| 2,213,894 | A * | 9/1940 | Barry | .......... 126/592 |
| 3,153,878 | A | 10/1964 | Smith, Jr. | |
| 4,051,890 | A | 10/1977 | Melchior | |
| 4,126,123 | A | 11/1978 | Hall | |
| 4,172,740 | A | 10/1979 | Campbell, III | |
| 4,235,679 | A | 11/1980 | Swaidan | |
| 4,252,107 | A | 2/1981 | Horton | |
| 4,284,067 | A * | 8/1981 | Kilar | .......... 126/620 |
| 4,297,521 | A | 10/1981 | Johnson | |
| 4,318,781 | A * | 3/1982 | Iida | .......... 202/173 |
| 4,344,418 | A | 8/1982 | Leroy | |
| 4,354,117 | A | 10/1982 | Abernathy | |
| 4,355,628 | A | 10/1982 | Watts | |
| 4,422,434 | A | 12/1983 | Statz et al. | |
| 4,487,659 | A | 12/1984 | Stark | |
| 4,504,362 | A | 3/1985 | Kruse | |
| 4,505,260 | A | 3/1985 | Metzger | |
| 4,512,235 | A * | 4/1985 | Lee et al. | .......... 86/23 |
| 4,512,335 | A * | 4/1985 | Mori | .......... 126/678 |
| 4,565,185 | A | 1/1986 | Mori | |
| 4,608,964 | A | 9/1986 | Russo | |
| 4,890,806 | A | 1/1990 | Mori | |
| 4,893,612 | A | 1/1990 | Dawson | |

(Continued)

OTHER PUBLICATIONS

International Search Report and Written Opinion for corresponding Application No. PCT/US08/57448, mailed Nov. 5, 2008, and pending claims, 15 pages.

(Continued)

*Primary Examiner*—Steven B McAllister
*Assistant Examiner*—Nikhil Mashruwala
(74) *Attorney, Agent, or Firm*—Brooks Kushman P.C.

(57) ABSTRACT

A collector for solar energy is disclosed having a closed hollow partially spherical container with a window for permitting solar energy to enter the container. The container has a reflective inner surface for retaining the energy. The collecting lens focuses the solar energy. Central tubing is provided and a pump circulates fluid through the tubing to a heat exchanger for transferring thermal energy from the fluid in the tubing to a utilization device.

19 Claims, 4 Drawing Sheets

U.S. PATENT DOCUMENTS

| | | |
|---|---|---|
| 4,978,458 A | 12/1990 | Inagaki et al. |
| 5,053,110 A | 10/1991 | Deutsch |
| 5,348,622 A | 9/1994 | Deutsch et al. |
| 5,628,879 A | 5/1997 | Woodruff |
| 5,632,147 A | 5/1997 | Greer |
| 5,650,050 A | 7/1997 | Kaufmann |
| 5,727,388 A | 3/1998 | Adamides |
| 6,001,222 A | 12/1999 | Klein |
| 6,568,386 B2 * | 5/2003 | Agata .......................... 126/634 |
| 6,656,326 B2 * | 12/2003 | Nagler ....................... 202/234 |
| 2004/0148933 A1 | 8/2004 | Miller |

OTHER PUBLICATIONS

Jon R. Luoma, "Catch The Fire", Innovative Dotcom Engineers Reinvent Solar Power, Discover, Aug. 2003, pp. 52-59.

http://www.solarpaces.org/csp_technology.htm, 2 pages, date unknown—believed to be prior art.

Hanan Sher, "Sunshine Boys", The Jerusalem Report, Jul. 10, 2006, p. 32.

"Star Power", Hadassah Magazine, Aug./Sep. 2006, p. 54.

International Preliminary Report for corresponding Application No. PCT/US2008/057448, mailed Oct. 1, 2009, 8 pages.

* cited by examiner

SOLAR POWER PLANT

CROSS-REFERENCE TO RELATED APPLICATIONS

This application claims the benefit of U.S. Provisional Application Ser. No. 60/783,956, filed Mar. 20, 2006.

FIELD OF THE INVENTION

This invention relates to an apparatus for capturing solar energy and using that energy for various power purposes such as boiling water, building heating, desalinization and the like.

BACKGROUND OF THE INVENTION

A variety of solar energy collectors have been proposed, particularly for use in areas in the middle latitudes which have a high percentage of sunlight. The energy produced may be used to desalinate water, produce thermal power for cooking or industrial operations, and a wide variety of similar uses. These devices all differ in their efficiency and in their cost and complexity. The present invention is accordingly directed toward a unit which is relatively simple in construction so as to be low in cost and reliable in operation and which converts a high percentage of the incident solar energy into useful thermal energy.

SUMMARY OF THE INVENTION

The present invention broadly takes the form or a unitary enclosure which has a window which supports one or more lenses formed in one of its walls. The entire structure is supported on a gimbal arrangement with electric actuators. A sensor follows the sun's position in the sky relative to the enclosure and continually moves the structure so that the window is directed toward the sun.

The interior of the container is mirrored, either continuously or in a tessellated manner. In one embodiment of the invention the container is spherical in form. The mirrors accordingly direct sunlight admitted into the interior of the container by the lens or lenses and the window so that it is reflected by the mirrored interior of the container toward the center of the container. A heat sink is supported at the focal point of the lens in contact with a heat collector taking the form of an elongated coiled tube, supported in the center of the enclosure, so as to be exposed to the solar radiation passing through the window and reflected by the mirrors. In one embodiment of the invention this collector takes the form of a tubular coil and in another embodiment of the invention the coil may be wound as a sphere supported in the center of the container. In yet another embodiment, the heat sink cooperates with an absorber or an evaporator, which may be provided by a tubular coil.

A pump circulates an operating fluid through the coil. The operating fluid may be water, a highly conductive liquid metal, or the like. The fluid is heated as a result of the thermal energy impinging on the coil The liquid in the coil may be used as a primary operating medium or may pass through a heat exchanger so as to heat water or the like which may be used to produce steam, as a heat transfer media for heating the interior of buildings, to evaporate sea water to produce potable water, or any other purpose for which solar stills have previously been proposed.

The resulting solar energy collector is simple in construction low in cost, and highly reliable in operation.

BRIEF DESCRIPTION OF THE DRAWINGS

Other objects, advantages and applications of the present invention will be made apparent by the following detailed description of preferred embodiments of the invention. The description makes reference to the accompanying drawings in which.

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
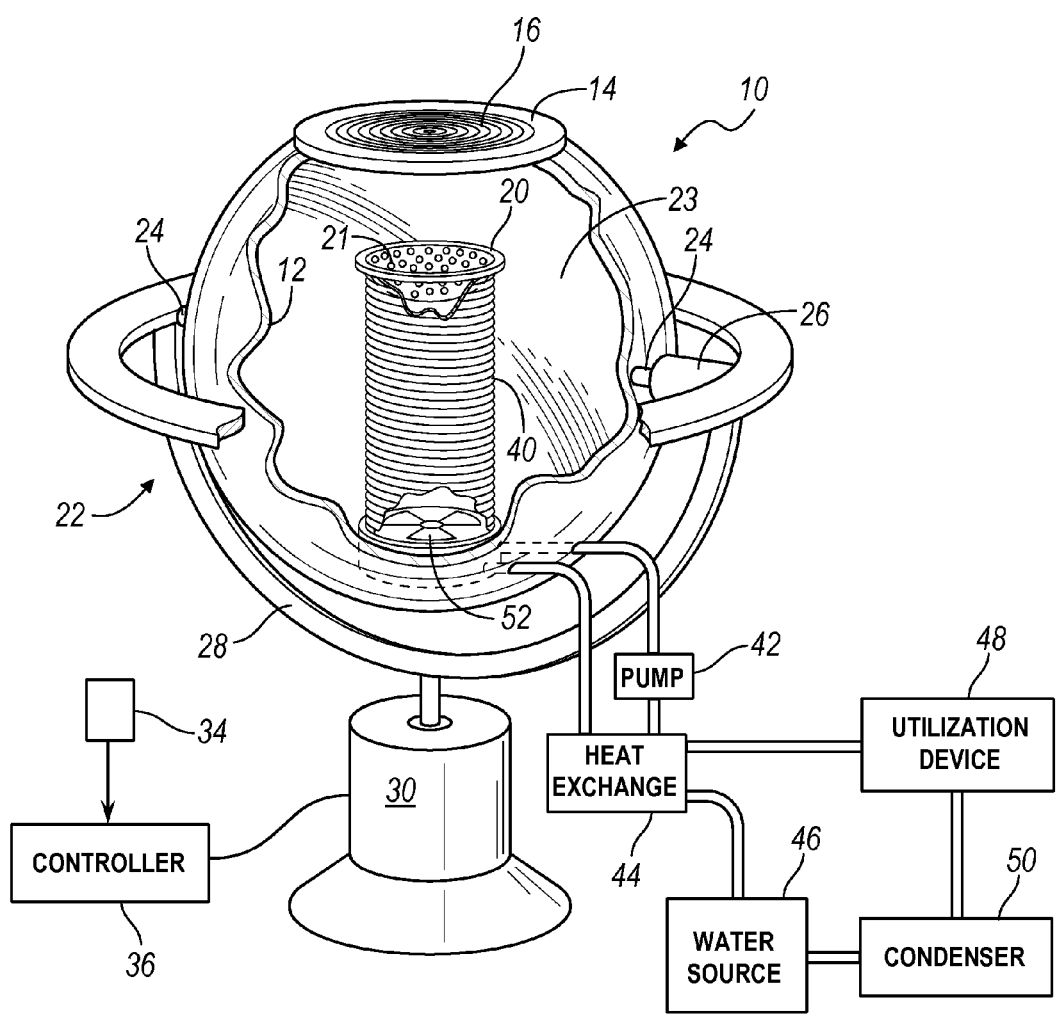
FIG. 1 is a perspective drawings, partially broken away, of a first embodiment according to the present invention employing a collector coil in the form of a cylindrical helix.

The solar collector of the present invention is constructed about a rigid container, generally indicated at 10 in FIG. 1. The container 10 is shown as being a sphere in the depicted embodiment, but other shapes are useful in connection with the present invention such as rectangular, oval, etc. The wall 12 of the container 10 is rigid and may include multiple layers with insulating material including a vacuum layer, to retain the heat produced by solar energy within the container 10.

The container 10 is fully enclosed with the exception of a transparent window 14. The window 14 may be of a varying dimension, but in the case of the spherical enclosure 10 occupies a minor fraction of the surface of the container, such as 10-20%. According to another embodiment, the window 14 occupies the entire upper hemisphere of the container 10 for permitting light to enter the container 10. A lens 16 is embedded in the window 14. In the embodiment of FIG. 1 the lens 16 is illustrated as a Fresnel lens, but a conventional lens could also be employed. The lens may occupy the entire window or only allowing light to pass through the remainder to the interior of the container 10 through the entire window area including the lens. The lens 16 focuses sunlight on the surface of a conical heat sink 20 supported in the center of the container 10. In another embodiment, the lens 16 is a bifocal lens for providing an intense beam of light into the window 14, while permitting other visual light to enter the window 14. The heat sink 20 has an array of ventilation holes 21 for permitting air within the container 10 to pass therethrough thereby providing even distribution of heat within the container 10.

As will subsequently be described, the container 10 is supported in a manner which allows the window 14 to be oriented to track the motion of the sun so that sunlight collected by the windows and lens 16 is directed to the interior of the container 10. According to another embodiment of the invention, a plurality of containers 10 are arranged in a grid for maximizing the collection of solar energy over a given surface area of land. Example of a grid type arrangement is disclosed in Mori U.S. Pat. No. 4,565,185 issued Jan. 21, 1986, which is incorporated in its entirety by reference herein.

An interior wall 23 of the container is reflective. In the embodiment of FIG. 1, a single reflective coating or a tessellated structure (FIG. 2) could be applied to the interior. The reflective coating could be vacuum formed on the interior 23 or the interior surface 23 could be polished to produce the necessary reflection. The mirrored interior 23 acts to reflect the light focused by the lens 16 through the volume of the container 12 and also acts to insulate the volume in the same manner as a reflective coating on the interior of a thermos bottle. The wall of the structure 12 could include a vacuum layer in a thermos bottle to improve its thermal retention.

In order to track the sun, the container 10 is supported on a gimbaled structure, generally indicated at 22. The container 10 is supported for rotation about the gimbal on an axis 24-24. A servo motor 26 rotates the container 10 about this axis to control the inclination of the sphere and accordingly inclination of the window 14 and the lens 16. The servo motor 26 and the axis 24-24 are supported on a gimbaled structure 28 which is in turn rotated by a servo motor 30. By control of the inclination of the container 10 through the servo motor 26 and rotation of the container 10 through rotation of the servo motor 30, the inclination and attitude of the window 14 may be controlled. A solar sensor 34 drives a microprocessor-based controller 36 to control the rotation of the motors 26 and 30 and thereby control the container 10 to track the sun. Thus, the gimbal is a turntable with two pivot points; one for rotation and the other for azimuth, which is orientation relative to the sun.

The thermal energy collected by the lens 16 and window 14 and reflected by the mirrored structure 23 is directed at the heat sink 20 which is in conductive contact with a central coil 40 arranged as a cylindrical helix. A pump 42, exterior of the container 10, pumps water, liquid metal, or other heat exchange fluid such as refrigerant through the coil 40 where it picks up heat and passes it to a heat exchanger 44. Water from the source 46 receives heat from the operating fluid and the heat exchanger 44 and provides it to a utilization device 48 which could be a steam engine, heating plant for a structure, or the like. A condenser 50 receives the output steam from the utilization device 48 and returns the condensed water to the source 46. A fan 52 circulates air within the container 10 through the hollow interior of the coil 40 and back downwardly, over the interior wall of the container 10 for even distribution or convection of the heat within the container 10.

Figure 2:
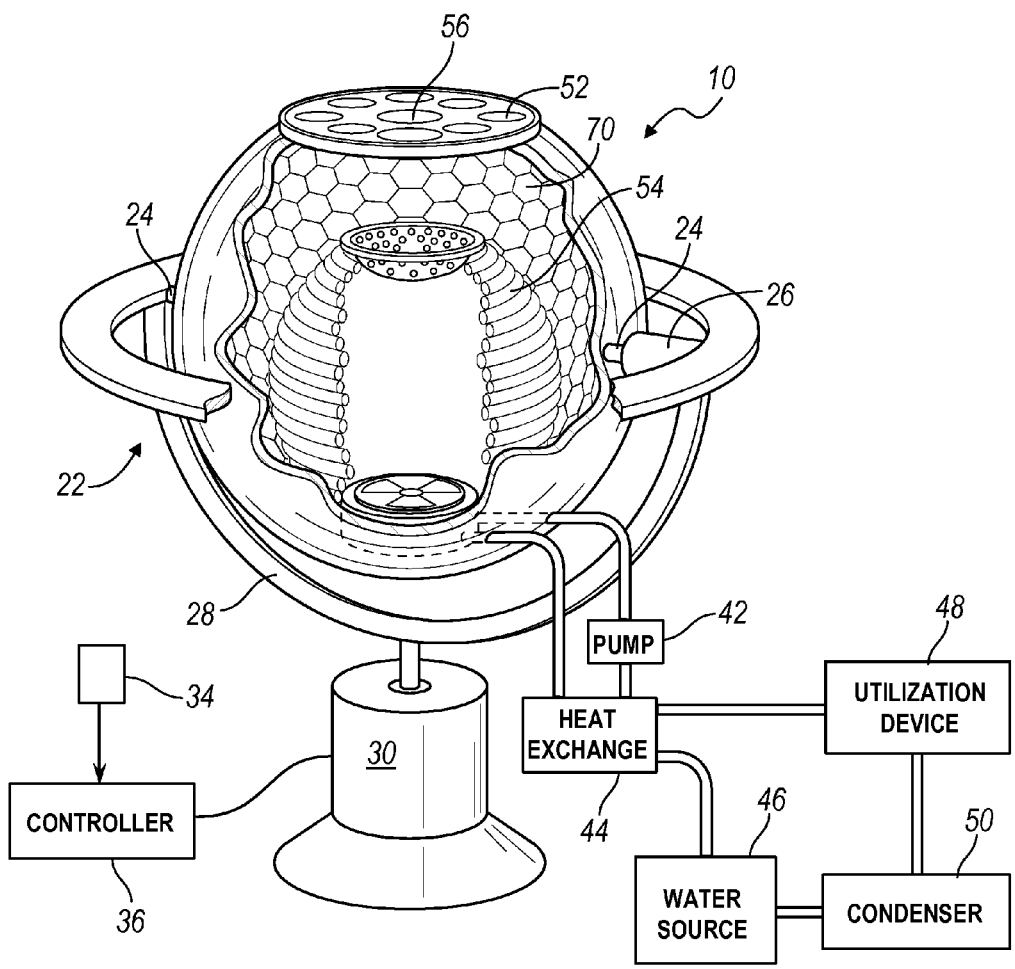
FIG. 2 is a perspective view, partially broken away, of a second embodiment according to the present invention employing a spherically wound collector coil.

An alternative embodiment of the invention, illustrated in FIG. 2, differs essentially from the embodiment of FIG. 1 in three aspects. First, instead of a single Fresnel lens disposed in the window 14, a plurality of lens, which may include a central Fresnel lens 50 and an array of conventional lenses 52, is supported in the window. Secondly, instead of the coil 40 being in the form of a cylindrical helix, it is wound as a spherical structure 54 which provides a more symmetrical arrangement and a more even distribution of the heat accumulated within the container 10. Finally, an interior wall 70 of the sphere 10 is covered with tessellated mirrors.

The thermal collector of the present invention is therefore simple in construction and in operation. It may be adjusted in size to provide a variety of capacities and its form may be engineered depending upon the geographical area in which it is employed.

Figure 3:
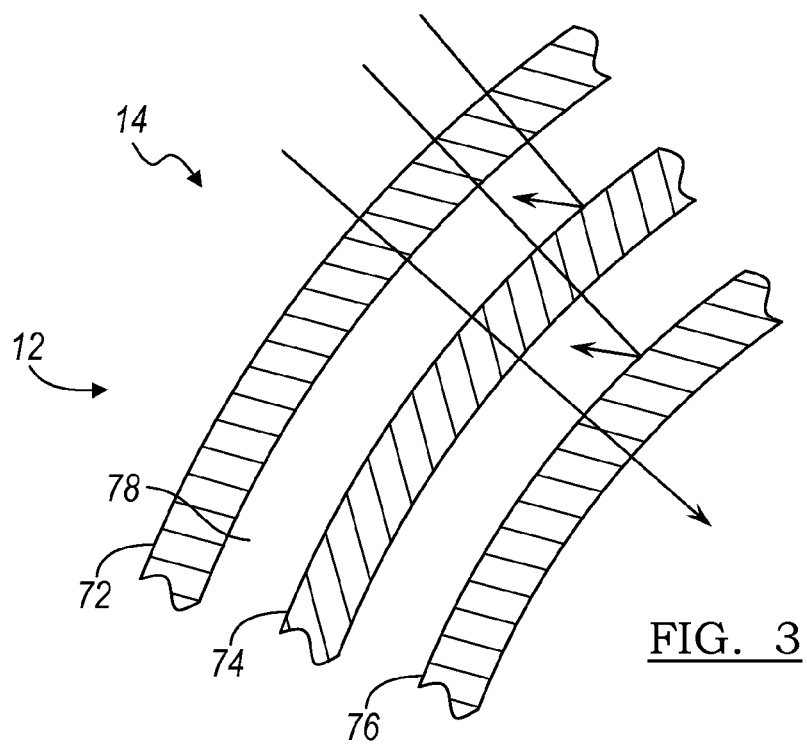
FIG. 3 is a partial section view of a container of another embodiment in accordance with the present invention.

Referring now to FIG. 3, the wall 12 of the container 10 is illustrated for another embodiment container 10. The wall 12 has multiple layers 72, 74, 76 with reflective inner surfaces. The multiple layers 72, 74, 76 of the wall 12 permit radiant heat and light to enter the window 14 of the wall 12 and for retaining the light and radiant heat once it enters the window 14. The reflective inner surfaces of the multiple layers 72, 74, 76 retain any light and radiant heat that may reflect off each layer 72, 74, 76. Additionally, each of the layers 72, 74, 76 may be configured to accept certain wavelengths of the light and radiant heat such that each layer 72, 74, 76 directs a prescribed wavelength range of light and reflects a prescribed wavelength range of light. Although three layers 72, 74, 76 are illustrated, the invention contemplates any number of layers in the wall 12. Additionally, a vacuum layer 78 may be provided between consecutive wall layers, such as layers 72, 74 to further insulate the wall 12 and prevent heat from escaping the container wall 12.

Figure 4:
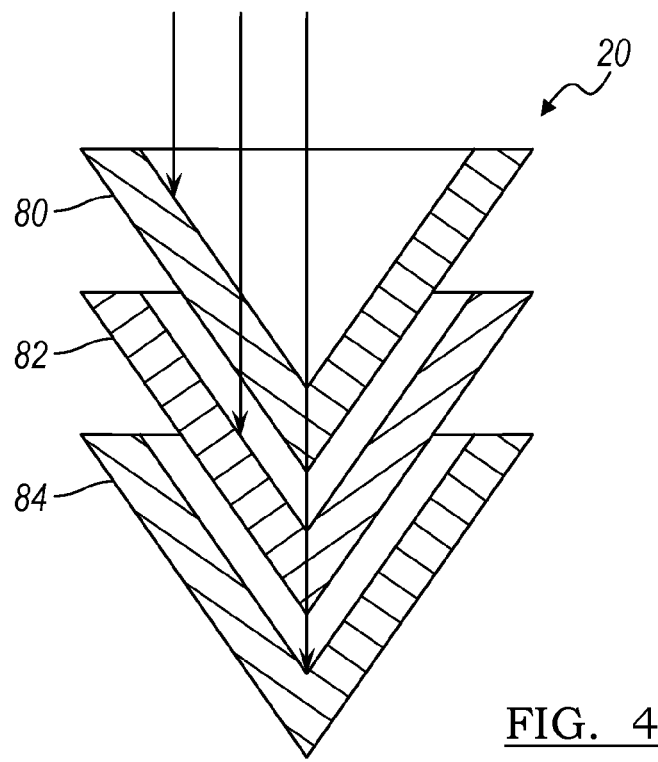
FIG. 4 is a section view of another embodiment of a heat sink in accordance with the present invention.

Referring now to FIG. 4, another heat sink 20 is illustrated depicting another embodiment. The heat sink 20 includes a series of heat sink layers 80, 82, 84, which may be stacked in axial alignment as depicted in FIG. 4. The additional heat sink layers 82, 84 collect light and radiant heat that passes through the first heat sink 80. For example, if light and radiant heat pass through the apertures 21 in the first heat sink 80, then the subsequent heat sink layers 82, 84 collect the light and radiant heat to ensure that all focused solar energy is collected by the heat sink 20. In another embodiment, the first heat sink layer 80 is configured to absorb heat from a predefined wavelength range. The first heat sink layer 80 may be partially transparent such that other wavelength ranges of light pass on to the subsequent heat sink layers 82, 84. Heat sink layers 80, 82, 84 of varying transparency may be stacked to incrementally absorb all of the focused light directed to the heat sink 20. Additionally, each heat sink layer 80, 82, 84 may have an undercoating to reflect solar energy to subsequent layers.

Figure 5:
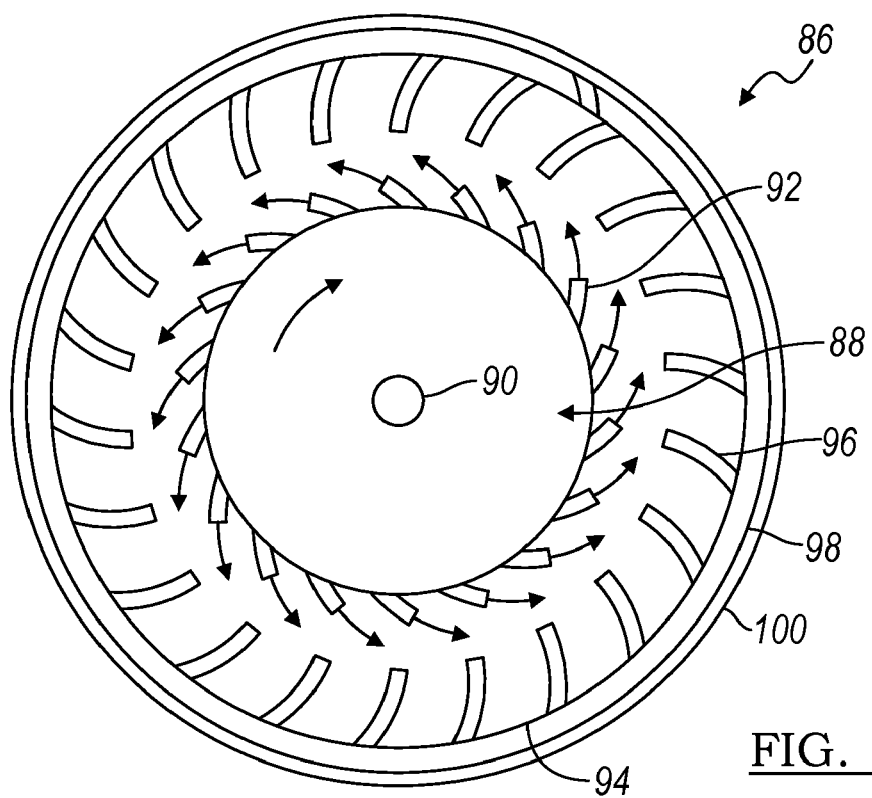
FIG. 5 is a schematic illustration of a torque converter for another embodiment in accordance with the present invention.

Various collectors for solar energy are disclosed, which may be utilized for various solar energy applications as discussed above. In one embodiment, the solar energy may be utilized for driving various utilization devices 48, such as a turbine. Conventional turbines experience difficulties in processing wet steam and therefore a large fraction of the steam may be released thereby reducing the efficiency of the turbine. One such difficulty associated with wet steam is the mass of the wet steam. Referring now to FIG. 5, a utilization device 48, such as a torque converter 86 is illustrated in accordance with the present invention. The torque converter 86 has a rotor 88 that is driven about a shaft 90. Condensed steam or wet steam is conveyed axially through the rotor 88 and exits about a radial array of generally tangential outlet nozzles 92. The wet steam exits the outlet nozzles 92 as illustrated by the arrows in FIG. 5. The outlet nozzles 92 are oriented generally tangentially for driving the rotor 88 about the shaft 90 in a clockwise direction as illustrated by the arcuate arrow. As the rotor 88 drives shaft 90, the torque converter 86 drives a generator for generating electrical energy. Alternatively, the rotor 88 may be utilized for providing any rotary output.

For maximizing output from the torque converter 86, the torque converter 86 may be oriented with an axis of rotation in the horizontal direction. The torque converter 86 in another embodiment includes a multiple arrays of nozzles 92 stacked axially for collectively driving the shaft 90.

In one embodiment, the torque converter 86 includes a drum 94 for enclosing the torque converter 86 and collecting the steam within the torque converter 86. The drum 94 may be stationery and may be provided with a radial array of stator blades 96 for providing a reaction force to the outlet steam for maximizing the efficiency of the rotor 88. The stator blades 96 may be formed from a simplified process, such as stock materials that are cold formed to provide low cost blades that may be interchanged as they experience fatigue and wear. Thus, many of the costs of conventional torque converter blades may be avoided by utilization of simplified stator blades 96. The drum 94 may extend axially with multiple arrays of stator blades 96 stacked axially in alignment with the axial arrays of nozzles 92.

According to another embodiment of the invention, the torque converter includes a rotary drum 94 that may also be connected to an output shaft for counter-rotation relative to the rotor 88. The shaft of the drum 94 may also drive a generator for optimizing the output of electricity generated from the rotation of the rotor 88 and drum 94 of the torque converter 86. Accordingly, the torque converter 86 may include a perforated shield 98 for collecting condensed steam that travels down and empties in a chase. Further, an outer housing 100 is provided of any suitable diameter for retaining the components of the torque converter 86.

The torque converter 86 may operate at a high torque and low speed for minimizing wear and damage to the torque converter 86 while maximizing output electricity generated by the torque converter 86. Various paths of fluid flow are contemplated within the spirit and scope of the present invention. For example, the fluid may travel in a toroidal path similar to that within a conventional torque converter.

The invention contemplates utilization of the solar power plant and/or the torque converter in various applications. Some applications may include the generation of high temperature water, as well as steam—including low temperature steam. Other applications may include pasteurizing, homogenizing, alcohol distribution, water distribution, curing (such as wood curing), baking, extruding (plastics), metal separation, hydrogen production, paper production, or any suitable application where solar energy is employed or power is generated.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A collector system for solar energy comprising:
   an at least partially closed hollow partially spherical container having a window for permitting solar energy to enter the container, and the container having a reflective inner surface for retaining solar energy within the container;
   wherein the container is supported on a gimbaled structure with one drive for inclination and a second drive motor for rotational orientation, with the drive motors being controlled by a sun sensor;
   central tubing supported in the container;
   a pump for a circulating liquid through the tubing;
   a heat sink mounted upon the tubing for receiving focused solar energy and for conducting the solar energy to the tubing;
   a torque converter comprising:
      a drum,
      a radial array of blades extending inward from the drum,
      a rotor driven about a shaft within the drum, and
      a radial array of tangential nozzles extending from the rotor in fluid communication with the heat exchanger for dispensing condensed steam from the nozzles at the stator blades thereby driving the rotor for rotation about the shaft;
   a heat exchanger for transferring thermal energy from the liquid in the tubing to the torque converter; and
   air contained within the container in contact with the tubing.

2. The collector system of claim 1 further comprising a means for supporting the container so that the window tracks the motion of the sun.

3. The collector system of claim 1 further comprising a collecting lens for focusing the solar energy.

4. The collector system of claim 3 wherein the collecting lens further comprises a Fresnel lens.

5. The collector system for solar energy of claim 1 further comprising a fan oriented within the container for forcing the air within the container about the tubing for even distribution of the collected solar energy.

6. The collector system of claim 1 wherein an internal atmosphere of the container has a reduced vacuum pressure to that external of the container.

7. The collector system of claim 1 wherein the container inner surface further comprises reflective tessellations.

8. The collector system of claim 1 wherein the heat exchange fluid further comprises a refrigerant.

9. The collector system of claim 3 wherein the collecting lens farther comprises a bifocal lens for providing an intense beam of light into the container, while permitting other visual light to enter the container.

10. The collector system of claim 1 wherein the window is provided by a hemisphere of the container.

11. The collector system of claim 1 wherein the container further comprises a wall having multiple layers which provide a series of spheres, each for collecting different wavelengths of light.

12. The collector system of claim 1 wherein the tubing is coiled.

13. The collector system of claim 12 wherein the tubing is coiled into a generally cylindrical configuration.

14. The collector system of claim 12 wherein the tubing is coiled into a generally spherical configuration.

15. The collector system of claim 1 wherein the heat sink further comprises a generally conical heat sink.

16. The collector system of claim 1 further comprising a collecting lens for focusing the solar energy, wherein the heat sink is mounted upon the tubing beneath the collecting lens for receiving the focused solar energy from the collecting lens and for conducting the solar energy to the tubing.

17. The collector system of claim 1 wherein the heat sink further comprises multiple layers.

18. The collector system of claim 1 wherein the drum is mounted for rotation relative to the torque converter such the dispensed condensed steam drives the drum for counter-rotation relative to the rotor.

19. A collector for solar energy comprising:
   an at least partially closed hollow partially spherical container having a window for permitting solar energy to enter the container, and the container having a reflective inner surface for retaining solar energy within the container;
   central tubing supported in the container;
   a pump for circulating fluid through the tubing;

a heat sink mounted upon the tubing for receiving focused solar energy and for conducting the solar energy to the tubing; and a heat exchanger for transferring thermal energy from the fluid in the tubing to a utilization device;

wherein the heat sink includes a series of apertures formed therethrough for permitting air to pass through the heat sink.

* * * * *

UNITED STATES PATENT AND TRADEMARK OFFICE
CERTIFICATE OF CORRECTION

| | | |
|---|---|---|
| PATENT NO. | : 7,669,592 B2 | Page 1 of 1 |
| APPLICATION NO. | : 11/725366 | |
| DATED | : March 2, 2010 | |
| INVENTOR(S) | : Steven Polk | |

It is certified that error appears in the above-identified patent and that said Letters Patent is hereby corrected as shown below:

Column 6, Line 60, Claim 19:

After "collector" insert -- system --.

Signed and Sealed this

Twentieth Day of April, 2010

David J. Kappos
*Director of the United States Patent and Trademark Office*